United States Patent [19]
Scholl et al.

[11] Patent Number: 5,733,965
[45] Date of Patent: Mar. 31, 1998

[54] RUBBER MIXTURES CONTAINING SULPHUROUS POLYOSTERS

[75] Inventors: Thomas Scholl, Bergisch Gladbach; Hermann-Josef Weidenhaupt, Pulheim; Ulrich Eisele, Leverkusen, all of Germany

[73] Assignee: Bayer AG, D-51368, Leverkusen, Germany

[21] Appl. No.: 651,595

[22] Filed: May 22, 1996

[30] Foreign Application Priority Data

Jun. 6, 1995 [DE] Germany ............... 195 20 598.7

[51] Int. Cl.$^6$ .................. C08L 7/00; C08L 9/00; C08L 11/00; C08L 23/16
[52] U.S. Cl. ............ 524/513; 525/167; 525/175; 525/176; 525/177; 528/293; 524/424; 524/442
[58] Field of Search ................ 525/167; 528/293; 524/513, 424, 442

[56] References Cited

U.S. PATENT DOCUMENTS

| | | | |
|---|---|---|---|
| 3,459,787 | 8/1969 | Weesner | 260/470 |
| 3,564,076 | 2/1971 | Kauder | 260/870 |
| 5,359,003 | 10/1994 | Horpel | 525/167 |

FOREIGN PATENT DOCUMENTS

| | | |
|---|---|---|
| 18015 | 10/1980 | European Pat. Off. . |
| GB 1090267 | 11/1967 | United Kingdom . |

OTHER PUBLICATIONS

J.K Stille, Introduction to Polymer Chemistry, p.191, John Wiley & Sons, Inc, New York (1962).

*Primary Examiner*—Patricia A. Short
*Attorney, Agent, or Firm*—Connolly & Hutz

[57] ABSTRACT

Rubber mixtures containing at least one rubber, one filler, optionally additional rubber auxiliary agents and also at least one sulphurous polyester are outstandingly suitable for the production of rubber vulcanisate having good mechanical properties and good hysteresis behaviour.

11 Claims, No Drawings

RUBBER MIXTURES CONTAINING SULPHUROUS POLYOSTERS

The present invention provides new rubber mixtures that contain, inter alia, sulphurous polyesters. The new rubber mixtures are outstandingly suitable for the production of rubber vulcanisates exhibiting good mechanical properties and good hysteresis behaviour. The rubber vulcanisates serve in particular to produce tyres with low rolling resistance that have good wet-skid resistance and good abrasion resistance.

Although vulcanisates with improved hysteresis behaviour are known, they possess a number of undesirable properties. For instance, in EP 253 365 hysteresis-improving agents based on certain nitroamines are described. However, owing to the risk of renitrosation there is a demand for rubber auxiliary agents that are free from nitro and nitroso groups. Similar misgivings also exist in the case of the nitrosoanilines described in US-PS 4 690 965. From EP 366 952 rubber vulcanisates with reduced hysteresis losses are moreover known which contain certain diphenyl sulphides. Disadvantageous in this case is the fact that these additives are ineffective in natural rubber and, furthermore, also decompose it (see US-PS 2 470 948). In DE-OS 2 141 159, DE-OS 2 141 160 and DE-OS 2 255 577 certain organosilanes are described by way of reinforcing additives, in particular for rubber vulcanisates that contain silicic acid. EP-A 447 066 also describes the use of these organosilanes for the production of tyre treads filled with silicic acid. By the combination of silicic-acid filler and organosilane it proved possible to reduce the rolling resistance of the tyre without, as is otherwise customary, impairing the abrasion resistance and the wet-skid resistance.

Surprisingly it has now been found that by the use of the sulphurous polyesters according to the invention it is possible to produce vulcanisates having considerably improved dynamic damping behaviour, good strength properties and good abrasion resistance. During vulcanisation the sulphurous polyesters crosslink the rubber chains with —S—Y—S bridges (Y=eg, alkyl which in comparison with polysulphidic bridges are very stable when subject to thermal and dynamic loading, resulting in the possibility of producing rubber articles in a relatively short time at relatively high temperature. Production of the sulphurous polyesters according to the invention does not require any expensive silane raw materials, thus resulting in cost advantages in practical application. Furthermore, unlike reinforcing additives based on silane, the polyesters according to the invention are not preferably dependent on the use of silicic acid but function independently of the filler, also in rubber mixtures filled with carbon black.

The present invention therefore provides rubber mixtures containing at least one rubber, one filler, optionally additional rubber auxiliary agents and also at least one sulphurous polyester having structural units of the general formula (I)

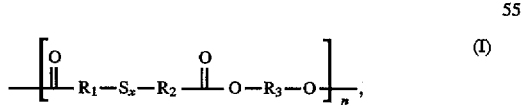

wherein the residues $R_1$ and $R_2$ are the same or different and stand for unbranched or branched, optionally substituted $C_1$—$C_{12}$ alkylene residues, $R_3$ represents an optionally substituted, unbranched or branched $C_1$–$C_{36}$ alkylene, which may be interrupted by oxygen-, sulfur- or nitrogen atoms, or $C_7$–$C_{36}$ alkylarylene residue, x stands for an integer between 1 and 8 and n stands for an integer between 2 and 100, in quantities from 0.05 to 15 wt-%, preferably 0.1 to 10 wt-%, relative to the quantity by weight of rubber employed in each case.

By way of substituents for the aforementioned residues $R_1$ to $R_3$ use may be made in particular of: OH, $OC_1$—$C_{12}$ alkyl, $CO_2$—$C_1$—$C_{12}$ alkyl, $C_6$—$C_{12}$ aryl or halogen.

Particularly preferred as substituents are: OH, $OCH_3$, $OC_2H_5$, $OC_3H_7$, $CO_2CH_3$, $CO_2C_2H_5$, $CO_2C_4H_9$, $C_6H_5$, Cl.

Preferred by way of residues $R_1$ and $R_2$ are:

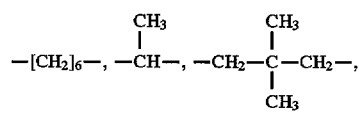

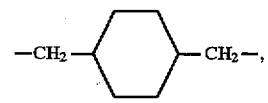

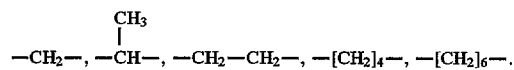

By way of alkylene residues $R_3$ use may be made in particular of:

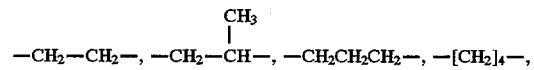

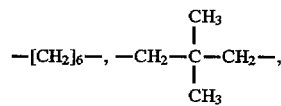

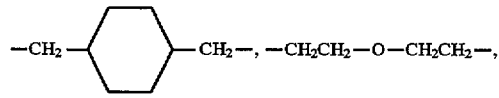

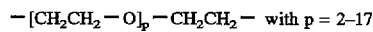

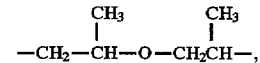

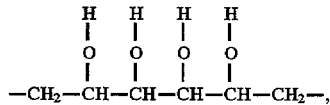

preference being given in particular to

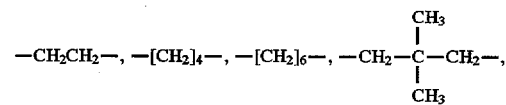

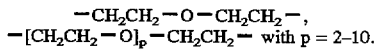

Preferred by way of alkylarylene residues are

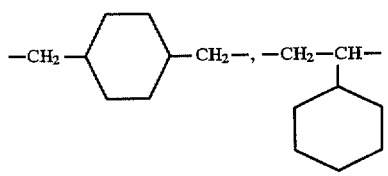

x preferably stands for an integer between 2 and 6 and n preferably stands for an integer between 2 and 20.

The polyesters having structural units of the formula (I) that are to be used in accordance with the invention have average molecular weights (weight average) between 400 and 20,000 and constitute, depending on molecular weight and structure, oils or solid substances.

The sulphurous polyesters according to the invention may be produced, eg, by esterification of polythio (bisalkylcarboxylic acids) with polyalcohols subject to dissociation of water or by esterification of polythio (bisalkylcarboxylic esters) with polyalcohols. The polythio (bisalkylcarboxylic acids) are produced, eg, by reaction of mercaptoalkylcarboxylic acids with sulphur dichloride or disulphur dichloride subject to dissociation of HCl. The production of the dicarboxylic acids according to this process is described in German patent application P 4 038 000.

Production of the sulphurous polyesters from polythio (bisalkylcarboxylic acids) and polyalcohols is preferably effected at temperatures from 60° to 140° C. in a suitable solvent such as cyclohexane, benzene, toluene and/or xylene, subject to separation of water. With a view to accelerating the reaction, use is preferably made of acid catalysts that are generally known for esterification and transesterification reactions, such as p-toluenesulphonic acid. In this connection the quantity of catalyst is kept as low as possible (preferably below 0.5%, relative to the end product). The molar ratios of dicarboxylic acid to polyalcohols should amount to around 1:0.5 to 1:1.5.

The sulphurous polyesters may also be produced by the use of alcohols having a valency greater than two. In order to avoid crosslinkages which could impair the effectiveness of the products, the polyalcohols should possess two primary hydroxyl functions which, by their nature, preferably react with the carboxyl groups. But polyalcohols with three or more primary hydroxyl functions are also suitable for the esterification, and result in branched polyesters. However, crosslinkages that lead to insolubility of the polyester should be avoided. Furthermore, monofunctional alcohols such as methanol, ethanol, butanol, hexanol, ethylhexyl alcohol and the like may be used concomitantly as chain-reaction terminators. In this connection, quantities of 30 mol-%, relative to polyalcohol, should not be exceeded.

Preferred dicarboxylic acids are, eg,

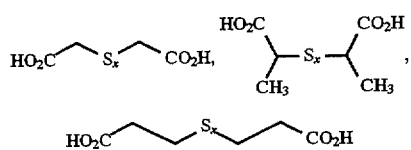

where x=1 to 6.

Preferred diols are, eg, ethylene glycol, diethylene glycol, tetraethylene glycol, 1,2-propanediol, 1,3-propanediol, 1,2-butanediol, 1,3-butanediol, 1,4-butanediol, 2,3-butanediol, 2,2-dimethyl-,1,3-propanediol, 1,5-pentanediol, 1,6-hexanediol, 2,5-hexanediol, 2-methyl-2-propyl-1,3 hexanediol, 2,2-diethyl- 1,3-propanediol, 2-ethyl-1,3-hexanediol,1,12-octadecanediol, octaethyleneglycol and/or 1,4-cyclohexanedimethanol.

Suitable polyhydric alcohols are, eg, glycerine, trimethylolpropane, pentaerythritol, xylitol and/or sorbitol.

In the course of production of the rubber mixtures according to the invention the addition to the rubber of the sulphurous polyesters according to the invention having structural units of the formula (I) and also the addition of the fillers was effected either in the first part of the mixing process at mass temperatures of 100° to 200° C. or optionally later at lower temperatures (about 40° to 100° C.), eg, together with crosslinking agents and optional accelerators and on their rubber auxiliary agents.

The sulphurous polyesters according to the invention having structural units (I) may be added to the mixing process both in pure form and also in a form in which they are spread onto an inert organic or inorganic carrier. Preferred carrier materials are silicic acids, natural or synthetic silicates, aluminium oxide or carbon blacks.

By way of fillers for the rubber mixtures and vulcanisates according to the invention use may be made, for example, of:

highly dispersed silicic acids, produced, eg, by precipitation of solutions of silicates or by flame hydrolysis of silicon halides having specific surfaces of 5 to 1000, preferably 20 to 400 m$^2$/g (BET surface) and primary-particle sizes of 100 to 400 nm. The silicic acids may optionally also be present as mixed oxides with other metal oxides such as oxides of Al, Mg, Ca, Ba, Zn, Zr, Ti.

Synthetic silicates such as aluminium silicate, alkaline earth metal silicates such as magnesium silicate or calcium silicate having BET surfaces of 20 to 400 mg$^2$/g and primary-particle diameters of 10 to 400 nm.

natural silicates such as kaolin and other naturally occurring silicic acids.

glass fibres and glass-fibre products (mats, strands) or micro-glass balls.

Use is preferably made of highly dispersed silicic acids, produced by precipitation of solutions of silicates having BET surfaces of 20 to 400 m$^2$/g in quantities from 5 to 150 parts by weight, relative to 100 parts rubber.

By way of fillers use may, of course, readily be made of carbon blacks. The carbon blacks to be used in this connection are produced in accordance with the furnace-black, furnace or gas-black process and possess BET surfaces of 20 to 200 m$^2$/g, such as SAF, ISAF, IISAF, HAAF, FEF or GPF carbon blacks.

The stated fillers may be used on their own or in a mixture, preferably in quantities from 10 to 250 parts by weight, relative to the quantity of rubber employed. In a particularly preferred embodiment use is made of 10 to 150 parts by weight of light-coloured fillers, together with 0 to 100 parts by weight of carbon black and also 0.3 to 15 parts by weight of a polyester having structural units (I), in each case relative to the amount of rubber employed, and also additional rubber auxiliary agents for production of the vulcanisates. In this connection the use of 0.3 to 10 wt-% of the polyester of the formula (I) is particularly preferred.

Besides natural rubber, synthetic rubbers are also suitable for the production of rubber vulcanisates according to the invention. Preferred synthetic rubbers are described, for example, in W Hofmann, Kautschuktechnologie, Gentner Verlag, Stuttgart 1980. They comprise, inter alia, BR—polybutadiene ABR—butadiene/acrylic acid $C_1$-$C_4$ alkyl ester copolymers CR—polychloroprene IR—Polyisoprene SBR—styrene/butadiene copolymers with styrene contents of 1 to 60, preferably 20 to 50 wt-%

IIR—isobutylene/isoprene copolymers

NBR—butadiene/acrylonitrile copolymers with acrylonitrile contents of 5 to 60, preferably 10 to 50 wt-%

HNBR—partially hydrated or fully hydrated NBR rubber

EPDM—ethylene/propylene/diene copolymers and also mixtures of these rubbers. Of interest for the production of motor-vehicle tyres are, in particular, anionically polymerised L-SBR rubbers with a glass transition temperature above −50° C. which may optionally be modified with silyl ethers or other functional groups such as are described in EP-A 447 066, as well as the mixtures thereof with diene rubbers.

The rubber vulcanisates according to the invention may contain additional rubber auxiliary agents such as reaction accelerators, anti-ageing agents, heat-stabilising agents, light-screening agents, ozone-screening agents, processing aids, plasticisers, tackifiers, foaming agents, dyestuffs, pigments, waxes, extenders, organic acids, retarding agents, metal oxides and also activators such as bis-(triethoxysilypropyl)-tetrasulphide, triethanol amine, polyethylene glycol, hexanetriol which are known to the rubber industry.

The rubber auxiliary agents are used in conventional quantities which depend, inter alia, on the intended application. Conventional quantities are, eg, quantities from 0.1 to 50 wt-%, relative to the amount of rubber employed.

By way of additional rubber auxiliary agents use is made of crosslinking agents—eg, peroxides, sulphur, magnesium oxide, zinc oxide—to which the known vulcanisation accelerators such as mercaptobenzthiazols, mercaptobenzthiazolsulphenamides, thiurames and thiocarbonates may also be added. Sulphur is preferred. The crosslinking agents and crosslinking accelerators are in each case used in quantities from 0.1 to 10 wt-%, preferably 0.1 to 5 wt-%, relative to the amount of rubber employed.

Vulcanisation can be effected at temperatures of 100° to 200° C., preferably 130° to 180° C., optionally under a pressure of 10 to 200 bar.

Blending of the rubbers with the filler and the polyesters (I) according to the invention can be carried out in conventional mixing aggregates such as rollers, internal mixers and mixing extruders.

The rubber vulcanisates according to the invention are suitable for the production of moulded bodies of the most diverse types—eg, for the production of cable sheaths, hoses, drive belts, conveyor belts, roller coatings, tyres, shoe soles, washers and damping elements, in particular for the production of tyres.

EXAMPLES

Example A1

Production of

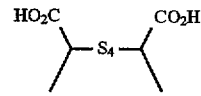

424 g (4 mol) 2-mercaptopropionic acid in 2 l toluene were mixed at 5° to 10° C. within a period of 3 hours with 270 g (2 mol) disulphur dichloride. Further stirring was effected for about 10 hours at room temperature and then filtration was performed. After thorough washing with toluene, 438 g of the dicarboxylic acid were obtained in the form of white crystals with an m.p. of 80° to 85° C.

$^1$H-NMR (D6-DMSO): 1.4 to 1.5 ppm (multiplet, 6 $CH_3$ protons); 3.7 to 4.0 ppm (multiplet, 2 CH protons).

Example A2

Production of 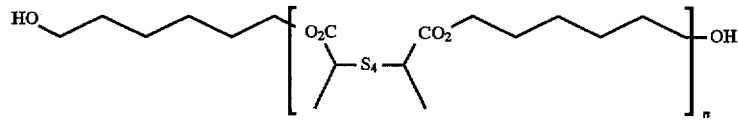

276 g (3 mol) thioglycollic acid were reacted with 202.5 g (1.5 mol) disulphur dichloride in accordance with the process of Example A1. 324.5 g of a colourless powder with an m.p. of 103° to 106° C. were obtained.

Example B1

Production of the polyester 274 g (1 mol) of the dicarboxylic acid from Example A1 were boiled at the water separator with 123.9 g (1.05 mol) 1,6-hexanediol with 0.1 g p-toluenesulphonic acid. After the reaction water had been removed, the solvent was distilled off, firstly under normal pressure and later in a vacuum, so that a temperature of 120° C. was not exceeded. 362 g of a light yellow, viscous oil were obtained. Average molecular weight (weight average) determined by gel permeation chromatography: 5,200.

Example B2

Production of the polyester

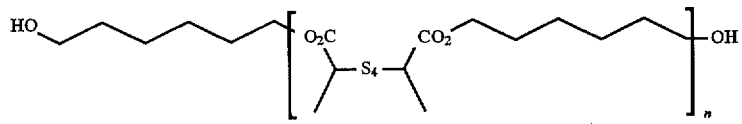

210 g of the dicarboxylic acid from Example A1 and 123.9 g 1,6-hexanediol, 0.1 g p-toluenesulphonic acid were reacted in 400 ml toluene in accordance with the process of Example B1. 301 g of a viscous, light yellow oil were obtained. Average molecular weight (weight average) by gel permeation chromatography: 2,400.

Elemental analysis: C: 42.8%, H: 6.5%, S: 32.3%, viscosity-(23° C.): 7.1 Pa.s

Example B3

Production of the polyester

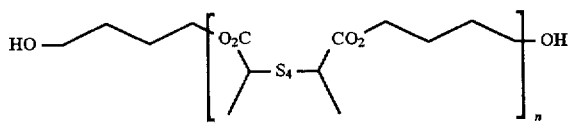

137 g (0.5 mol) of the dicarboxylic acid from Example A1 were boiled at the water separator with 49.5 g (0.55 mol) 1,4-butanediol and also 0.1 g p-toluenesulphonic acid in 300 ml toluene. After the reaction water had been removed, the solvent was distilled off, firstly under normal pressure and later in a vacuum, so that the temperature remained below 120° C. 169 g of a light yellow, viscous oil were obtained.

Example B4

Production of the polyester

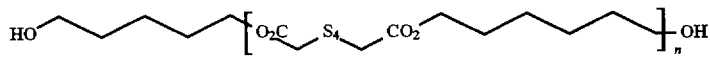

In a manner analogous to the process from Example B1, 123.0 g (0.5 mol) of the dicarboxylic acid A2 were reacted with 64.9 g (0.55 mol) 1,6-hexanediol and 0.1 g pTs in 300 ml toluene. After removal of the reaction water over a period of about 3 hours, 172.5 g of a yellow viscous oil were obtained. Average molecular weight (weight average) determined by gel permeation chromatography: 3,300.

Examples C1 to C3

The following rubber mixtures were produced at 140° C. in a 1.5-1 kneader. After cooling, the kneading process was repeated once more at the same temperature. Then sulphur and accelerators (diphenylguanidine, N-cyclohexylmercaptobenzthiazolsulphenamide and tetramethylthiuramedisulphide) were admixed on the roller at 60° to 80°. Thereupon the rubber mixtures were vulcanised for 45 minutes at 160° C.

TABLE 1

|  | C1 | C2 | C3 |
|---|---|---|---|
| S-SBR (Buna VSL 1954 S 25; Bayer) | 25 | 25 | 25 |
| Silicic acid (Vulkasil S; Bayer) | 80 | 80 | 80 |
| ZnO | 2.5 | 2.5 | 2.5 |
| Stearic acid | 1 | 1 | 1 |
| Carbon black (Corax N 339, Degussa) | 6 | 6 | 6 |
| Aromatic oil | 32.5 | 32.5 | 32.5 |
| Antioxidant 1 (Vulkanox HS; Bayer) | 1 | 1 | 1 |
| Antioxidant 2 (Vulkanox 4020; Bayer) | 1 | 1 | 1 |
| Ozone-protection wax (Antilux 654, Rheinchemie) | 1.5 | 1.5 | 1.5 |
| Bis-(triethoxysilylpropyl)-tetrasulphide (Si 69, Degussa) | 6.5 | 0 | 0 |
| Polyester acc. to Example B2 | 0 | 6.5 | 0 |
| Polyester acc. to Example B4 | 0 | 0 | 6.5 |
| Diphenylguanidine (Vulkacit DPG; Bayer) | 2 | 2 | 0 |
| N-cyclohexyl-mercaptobenzthiazolsulphenamide (Vulkacit CZ; Bayer) | 1.5 | 1.5 | 1.5 |
| Tetramethylthiuramedisulphide | 0 | 0 | 0.4 |
| Sulphur | 2 | 2 | 2 |
| Stress value with 100% elongation (MPa) | 2.9 | 3.0 | 3.7 |
| Strength (MPa) | 20.6 | 16.7 | 15.7 |
| Breaking elongation (%) | 496 | 617 | 529 |
| Hardness at 23° C. (Shore A) | 72 | 75 | 80 |
| Hardness at 70° C. (Shore A) | 68 | 75 | 81 |
| Tan delta at 60° C. | 0.135 | 0.092 | 0.095 |
| Abrasion DIN 53 516 (mm³) | 80 | 75 | 27 |
| Increase in temperature (°C.) | 30 | 23 | 24 |

The results of measurement make clear that with the aid of the polyesters according to the invention considerable improvements in the dynamic damping behaviour can be achieved. For instance, the tan delta at 60° C., which correlates with a lower rolling resistance of the tyre, is reduced by about 30%. The increase in temperature in the case of dynamic loading, measured with the Goodrich flexometer, is accordingly distinctly lower than in the case of the reference sample, which was vulcanised with a conventional silane-filler activator (bistriethoxysilylpropyl)-tetrasulphide.

Examples C4 to C6

The following rubber mixtures were produced in a 1.5-1 kneader at 130° to 140° C. Thereupon sulphur, accelerators (tetramethylthiuramedisulphide and N-cyclohexylmercaptobenzthiazol) and a polyester according to Example B4 were mixed on the roller at 60° to 80° C. Vulcanisation was effected in 30 minutes at 160° C.

TABLE 2

|  | C4 | C5 | C6 |
| --- | --- | --- | --- |
| E-SBR (Buna EM 1500; Hüls) | 70 | 70 | 70 |
| E-SBR (Buna EM 1778; Hüls) | 41 | 41 | 41 |
| Silicic acid (Vulkasil S; Bayer) | 50 | 50 | 50 |
| Zinc oxide | 3 | 3 | 3 |
| Stearic acid | 2 | 2 | 2 |
| Diethylene glycol | 1.5 | 1.5 | 1.5 |
| Coumarone resin | 5 | 5 | 5 |
| Bis-(triethoxysilylpropyl)-tetrasulphide | 0 | 3.5 | 0 |
| Sulphur | 2 | 2 | 2 |
| N-cyclohexyl-mercaptobenzthiazolsulphenamide | 1.5 | 1.5 | 1.5 |
| Tetramethylthiuramedisulphide | 0.1 | 0.1 | 0.1 |
| Polyester acc. to Example B4 | 0 | 0 | 6 |
| Stress value with 100% elongation (MPa) | 1.1 | 2.2 | 2.1 |
| Strength (MPa) | 15.6 | 19.2 | 14.8 |
| Breaking elongation (%) | 855 | 561 | 596 |
| Hardness at 23° C. (Shore A) | 58 | 67 | 68 |
| Hardness at 70° C. (Shore A) | 52 | 64 | 64 |
| Tan delta at 60° C. | 0.15 | 0.1 | 0.072 |
| Abrasion DIN 53 516 (mm³) | 248 | 116 | 109 |

The test results of these E-SBR vulcanisates also prove that the polyesters according to the invention bring about surprising and distinct improvements in the dynamic damping behaviour and in the abrasion behaviour.

We claim:

1. A rubber mixture containing at least one rubber, at least one filler, optionally additional rubber auxiliary agents and also at least one sulphurous polyester which comprises a sulphurous polyester having structural units of general formula (I)

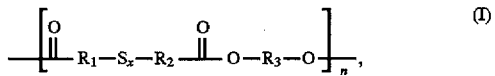

where the residues $R_1$ and $R_2$ are the same or different and stand for unbranched or branched, optionally substituted $C_1$–$C_{12}$ alkylene residues, $R_3$ represents an optionally substituted, unbranched or branched $C_1$–$C_{36}$, which may be interrupted by oxygen-, nitrogen- or sulfur atoms, alkylene or $C_7$–$C_{36}$ alkylarylene residue, x is an integer from 3 to 8, and n is an integer from 2 to 100, in quantities from 0.05 to 15 wt-%, relative to the quantity by weight of rubber employed in each case.

2. A rubber mixture according to claim 1, wherein said at least one sulphurous polyester comprises a sulphurous polyester having structural units of the general formula (I) wherein x is 3.

3. A rubber mixture according to claim 1, wherein said at least one sulphurous polyester comprises a sulphurous polyester having structural units of the general formula (I) wherein x is 5.

4. A rubber mixture according to claim 1, wherein said at least one sulphurous polyester comprises a sulphurous polyester having structural units of the general formula (I) wherein x is 6.

5. A rubber mixture according to claim 1, wherein said at least one sulphurous polyester comprises a sulphurous polyester having structural units of the general formula (I) wherein x is 7.

6. A rubber mixture according to claim 1, wherein said at least one sulphurous polyester comprises a sulphurous polyester having structural units of the general formula (I) wherein x is 8.

7. A rubber mixture containing at least one rubber, at least one filler, optionally additional rubber auxiliary agents and also at least one sulphurous polyester having structural units of general formula (I)

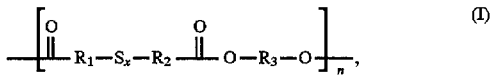

where the residues $R_1$ and $R_2$ are the same or different and stand for unbranched or branched, optionally substituted $C_1$–$C_{12}$ alkylene residues, $R_3$ represents an optionally substituted, unbranched or branched $C_1$–$C_{36}$, which may be interrupted by oxygen-, nitrogen- or sulfur atoms, alkylene or $C_7$–$C_{36}$ alkylarylene residue;

x is an integer from 4 to 8, and n is an integer from 2 to 100, in quantities from 0.05 to 15 wt-%, relative to the quantity by weight of rubber employed in each case.

8. A rubber mixture according to claim 7, wherein the mixture contains the sulphurous polyesters in quantities from 0.1 to 10 wt-%, relative to the quantity by weight of rubber employed in each case.

9. A rubber mixture according to claim 7, wherein the mixture contains fillers in quantities from 10 to 250 parts by weight and also optionally a vulcanisation accelerator and sulphur each in quantities from 0.1 to 10 wt-% and optionally additional auxiliary agents in quantities from 0.1 to 50 wt-%, relative to the amount of rubber employed in each case.

10. A moulded body produced from the rubber mixture of claim 7.

11. A tire produced from the rubber mixture of claim 7.

* * * * *